US012049251B2

(12) United States Patent
Goodarzi et al.

(10) Patent No.: US 12,049,251 B2
(45) Date of Patent: Jul. 30, 2024

(54) TRAILER TRACKING CONTROL

(71) Applicant: GM GLOBAL TECHNOLOGY OPERATIONS LLC, Detroit, MI (US)

(72) Inventors: Avesta Goodarzi, Whitby (CA); Norman J. Weigert, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 585 days.

(21) Appl. No.: 17/168,429

(22) Filed: Feb. 5, 2021

(65) Prior Publication Data

US 2022/0250680 A1    Aug. 11, 2022

(51) Int. Cl.
| | |
|---|---|
| *B62D 11/10* | (2006.01) |
| *B60D 1/24* | (2006.01) |
| *B60D 1/30* | (2006.01) |
| *B60D 1/58* | (2006.01) |
| *B62D 13/00* | (2006.01) |

(52) U.S. Cl.
CPC .............. *B62D 11/10* (2013.01); *B60D 1/246* (2013.01); *B60D 1/30* (2013.01); *B60D 1/58* (2013.01); *B62D 13/005* (2013.01)

(58) Field of Classification Search
None
See application file for complete search history.

(56) References Cited

U.S. PATENT DOCUMENTS

| | | | |
|---|---|---|---|
| 5,523,947 A | 6/1996 | Breen | |
| 6,292,094 B1 * | 9/2001 | Deng | B62D 7/159 701/44 |
| 8,469,384 B2 | 6/2013 | Andre | |
| 9,988,085 B2 * | 6/2018 | Greul | B62D 15/027 |
| 10,173,669 B2 * | 1/2019 | Alm | B60W 20/15 |
| 10,173,722 B2 * | 1/2019 | Pourrezaei Khaligh | B60D 1/62 |
| 10,370,030 B2 | 8/2019 | Rhode et al. | |
| 10,647,348 B2 * | 5/2020 | Li | B62D 7/14 |
| 10,759,428 B2 * | 9/2020 | Kahn | B60W 30/18036 |
| 11,420,695 B2 * | 8/2022 | Viele | B62D 53/005 |
| 2016/0368336 A1 * | 12/2016 | Kahn | B60W 30/06 |
| 2017/0320520 A1 * | 11/2017 | Greul | B62D 15/027 |
| 2017/0361844 A1 * | 12/2017 | Kahn | B60W 30/06 |

(Continued)

FOREIGN PATENT DOCUMENTS

| | | | | |
|---|---|---|---|---|
| AU | 2011380327 A1 * | 5/2014 | ............ | B60T 8/1708 |
| AU | 2015276542 A1 * | 1/2017 | ............. | B62D 13/00 |

(Continued)

OTHER PUBLICATIONS

Chinese Office Action for Chinese Application No. 202111541937. 6; Report dated Jun. 5, 2023 with English translation (14 Pages).

(Continued)

*Primary Examiner* — Kevin R Steckbauer
(74) *Attorney, Agent, or Firm* — CANTOR COLBURN LLP (57) ABSTRACT

A tow configuration may include a tow vehicle and first and second trailers. The intermediate trailer hitch angle with the tow vehicle is controlled with one objective being to improve the off-tracking performance of the other trailer. The hitch angle may be controlled through steerable wheels at the intermediate trailer or through wheel differential steering at the intermediate trailer.

15 Claims, 5 Drawing Sheets

(56) References Cited

U.S. PATENT DOCUMENTS

| | | | |
|---|---|---|---|
| 2018/0111621 A1* | 4/2018 | Buss | B60W 40/10 |
| 2018/0290685 A1* | 10/2018 | Boos | B62D 13/06 |
| 2018/0304944 A1 | 10/2018 | Wright | |
| 2019/0233034 A1* | 8/2019 | Viele | B60D 1/36 |
| 2021/0188229 A1* | 6/2021 | Plaehn | B60T 7/20 |
| 2022/0017161 A1* | 1/2022 | Layfield | B60D 1/30 |
| 2022/0250680 A1* | 8/2022 | Goodarzi | B62D 53/005 |
| 2022/0355860 A1* | 11/2022 | Rydström | B62D 13/00 |
| 2023/0080456 A1* | 3/2023 | Fröjd | B62D 13/005 |
| | | | 280/419 |

FOREIGN PATENT DOCUMENTS

| | | | | |
|---|---|---|---|---|
| AU | 2015276542 B2 * | 10/2018 | | B62D 13/00 |
| CA | 2989995 C * | 5/2023 | | B60D 1/30 |
| CN | 114852170 A * | 8/2022 | | B60D 1/246 |
| CN | 115052802 A * | 9/2022 | | B62D 13/005 |
| CN | 115303384 A * | 11/2022 | | B62D 13/00 |
| DE | 102008060801 B3 * | 4/2010 | | B62D 13/00 |
| DE | 102014108484 A1 * | 12/2015 | | B62D 13/00 |
| DE | 102015221120 B4 * | 2/2021 | | A01B 69/003 |
| DE | 102014108484 B4 * | 7/2021 | | B62D 13/00 |
| DE | 102021130552 A1 * | 8/2022 | | B60D 1/246 |
| EP | 1847442 A2 | 10/2007 | | |
| EP | 2192024 A2 * | 6/2010 | | B62D 13/00 |
| EP | 4086147 A1 * | 11/2022 | | B62D 13/00 |
| JP | H09286346 A | 11/1997 | | |
| JP | H09286346 A * | 11/1997 | | |
| NL | 2001592 C2 | 11/2009 | | |
| WO | WO-2015192986 A1 * | 12/2015 | | B62D 13/00 |
| WO | 2016058595 A1 | 4/2016 | | |
| WO | WO-2021160252 A1 * | 8/2021 | | B62D 13/005 |
| WO | WO-2021249088 A1 * | 12/2021 | | B60W 30/165 |

OTHER PUBLICATIONS

Chinese Office Action for Chinese Application No. 202111541937.6; Report Mail Date Jun. 5, 2023 with English translation (14 Pages).

Chinese Office Action for Chinese Application No. 202111541937.6; Report Mail Date Dec. 19, 2023 with English translation (7 Pages).

Office Action issued in German Patent Application No. 102021130552.7; Application Filing Date Nov. 23, 2021; Date of Mailing Apr. 24, 2024 (8 pages).

* cited by examiner

TRAILER TRACKING CONTROL

INTRODUCTION

Many vehicles are designed to accommodate the towing or trailering of various loads, including without limitation: cargo, campers, boats, and other vehicles. Trailering presents challenges to the operator of the tow vehicle who must maneuver the tow vehicle in consideration of the pavement geometry and trailer tracking. A trailer's path of travel may deviate from the path of travel of the tow vehicle. Such off tracking is generally undesirable and may be more acute in sharper turns and with longer trailer dimensions.

Common towing arrangements include a tow vehicle and a single trailer. Other tow arrangements may include multiple trailers. Multiple trailer arrangements may exhibit increased off tracking.

SUMMARY

In one exemplary embodiment, an apparatus for towing a first trailer by a tow vehicle may include a second trailer having at least one axle and at least two wheels, a first hitch point and a second hitch point. The second trailer is articulatably coupled to the tow vehicle at the first hitch point at a hitch articulation angle and articulatably coupled to the first trailer at the second hitch point. A controller may establish the hitch articulation angle to a target hitch articulation angle.

In addition to one or more of the features described herein, the at least two wheels may include steerable wheels and the hitch articulation angle may be established to the target hitch articulation angle by controlling a steering angle of the steerable wheels.

In addition to one or more of the features described herein, the hitch articulation angle may be established to the target hitch articulation angle by controlling a speed differential between the at least two wheels.

In addition to one or more of the features described herein, controlling the steering angle of the steerable wheels may include determining the target hitch articulation angle based upon a steering angle of the tow vehicle, determining a target steering angle of the steerable wheels based upon the steering angle of the tow vehicle and the target hitch articulation angle, and controlling the steering angle of the steerable wheels to the target steering angle of the steerable wheels.

In addition to one or more of the features described herein, controlling the steering angle of the steerable wheels may further include determining an error between a measured hitch articulation angle and the target hitch articulation angle, and adjusting the target steering angle of the steerable wheels based upon the error.

In addition to one or more of the features described herein, the target hitch articulation angle may be determined in accordance with the following relationships:

$$\theta_{1-target} = \sin^{-1}\frac{\lambda \tan\delta_V}{\sqrt{d^2(\tan\delta_V)^2 + L_1^2}} - \tan^{-1}\frac{e}{L_2 - c} - \cos^{-1}\frac{L_1}{\sqrt{d^2(\tan\delta_V)^2 + L_1^2}};$$

$$\lambda = \frac{(a+L_1)^2 - (L_3^2 + d^2) + \frac{2bL_1}{\tan\delta_V} + b^2}{2L_3}; \text{ and } L_3 = \sqrt{(L_2-c)^2 + e^2};$$

wherein $\theta_{1-target}$ is the target hitch articulation angle;
$L_1$ is a wheelbase of the tow vehicle;
$L_2$ is the second trailer length between the first hitch point and the second hitch point;
$L_3$ is the distance between the first hitch point and a predetermined point on the second trailer;
$\delta_V$ is the steering angle of the tow vehicle;
a is a longitudinal distance from a front axle center point on the tow vehicle to a predetermined point on the tow vehicle;
b is a lateral distance from the front axle center point to the predetermined point on the tow vehicle;
c is a longitudinal distance from the second hitch point to the predetermined point on the second trailer;
d is a distance between a rear axle center point on the tow vehicle and the first hitch point; and e is a lateral distance from the second hitch point to the predetermined point on the second trailer.

In addition to one or more of the features described herein, the target steering angle may be determined in accordance with the following relationships:

$$\delta_{T-target} = \theta_{1-target} + \tan^{-1}\left[\frac{\tan\delta_V\left(d + \frac{L_2}{2}\cos\theta_{1-target}\right)}{L_1 + \frac{L_2}{2}\sin\theta_{1-target}\tan\delta_V}\right];$$

wherein $\delta_{T-target}$ is the target steering angle;
$\theta_{1-target}$ is the target hitch articulation angle;
$L_1$ is a wheelbase of the tow vehicle;
$L_2$ is the second trailer length between the first hitch point and the second hitch point;
$\delta_V$ is the steering angle of the tow vehicle; and
d is a distance between a rear axle center point on the tow vehicle and the first hitch point.

In addition to one or more of the features described herein, the target hitch articulation angle may be based upon a steering angle of the tow vehicle.

In addition to one or more of the features described herein, controlling the speed differential between the at least two wheels may include determining an error between a measured hitch articulation angle and the target hitch articulation angle, and adjusting the speed differential between the at least two wheels based upon the error.

In addition to one or more of the features described herein, the intermediate trailer may include a powertrain providing propulsion torque to at least one of the two wheels.

In addition to one or more of the features described herein, the intermediate trailer may include a powertrain providing propulsion torque to at least one of the two wheels.

In addition to one or more of the features described herein, the intermediate trailer may include a system providing braking torque to at least one of the two wheels.

In addition to one or more of the features described herein, the intermediate trailer may include a system providing braking torque to at least one of the two wheels.

In another exemplary embodiment, a towing system may include a tow vehicle, a first trailer, an intermediate trailer having at least one axle and at least two wheels and a steering system, the intermediate vehicle articulatably coupled to the tow vehicle at a first hitch point at a hitch articulation angle and articulatably coupled to the first trailer at a second hitch point, and a controller establishing the hitch articulation angle to a target hitch articulation angle by controlling steering of the at least two wheels.

In addition to one or more of the features described herein, controlling the steering of the steerable wheels may include determining the target hitch articulation angle based upon a steering angle of the tow vehicle, determining a target steering angle of the steerable wheels based upon the steering angle of the tow vehicle and the target hitch articulation angle, and controlling a steering angle of the steerable wheels to the target steering angle of the steerable wheels.

In addition to one or more of the features described herein, controlling the steering of the steerable wheels may further include determining an error between a measured hitch articulation angle and the target hitch articulation angle, and adjusting the target steering angle of the steerable wheels based upon the error.

In yet another exemplary embodiment, a towing system may include a tow vehicle, a first trailer, an intermediate trailer having at least one axle and at least two wheels, the intermediate vehicle articulatably coupled to the tow vehicle at a first hitch point at a hitch articulation angle and articulatably coupled to the first trailer at a second hitch point, and a controller establishing the hitch articulation angle to a target hitch articulation angle by controlling a speed differential between the at least two wheels.

In addition to one or more of the features described herein, controlling the speed differential between the at least two wheels may include determining the target hitch articulation angle based upon a steering angle of the tow vehicle, determining an error between a measured hitch articulation angle and the target hitch articulation angle, and adjusting the speed differential between the at least two wheels based upon the error.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. Throughout the drawings, corresponding reference numerals indicate like or corresponding parts and features. As used herein, control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle networks (e.g. Controller Area Network (CAN), Local Interconnect Network (LIN) and in-plant and service-related networks. Control module functions as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

Figure 1:
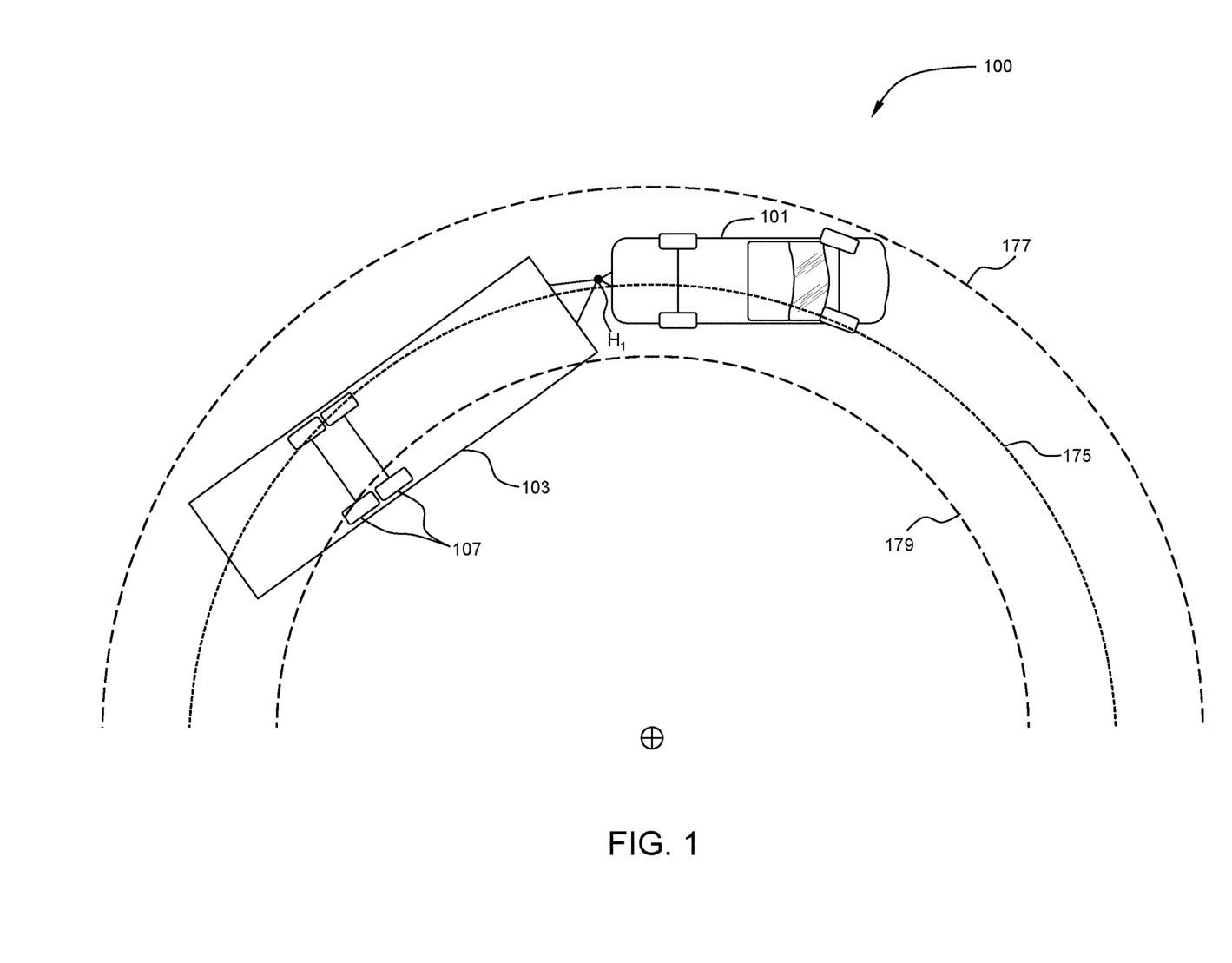
FIG. 1 illustrates a single trailer towing configuration with off-tracking, in accordance with the present disclosure.

FIG. 1 illustrates a single trailer towing configuration 100 including a tow vehicle 101 and a trailer 103. The tow vehicle 101 and the trailer 103 are coupled at a hitch point ($H_1$) which allows for the articulation of the trailer 103 and the tow vehicle 101 during maneuvers around curves and corners. Single trailer towing configurations may exhibit some degree of off-tracking characterized by the trailer wheels 107 tracking to the inside of the tow vehicle 101 inner wheel path 175. Some degree of off-tracking may be acceptable. However, as the tow vehicle 101 turning radius is reduced, the amount of off-tracking of the trailer 103 may become more pronounced. Some compensation by the driver may be obtained by controlling the tow vehicle 101 toward the outer lane limit 177 which maximizes the available turning radius. However, at some turning radius, the trailer 103 may off-track outside of the inner lane limit 179.

Figure 2:
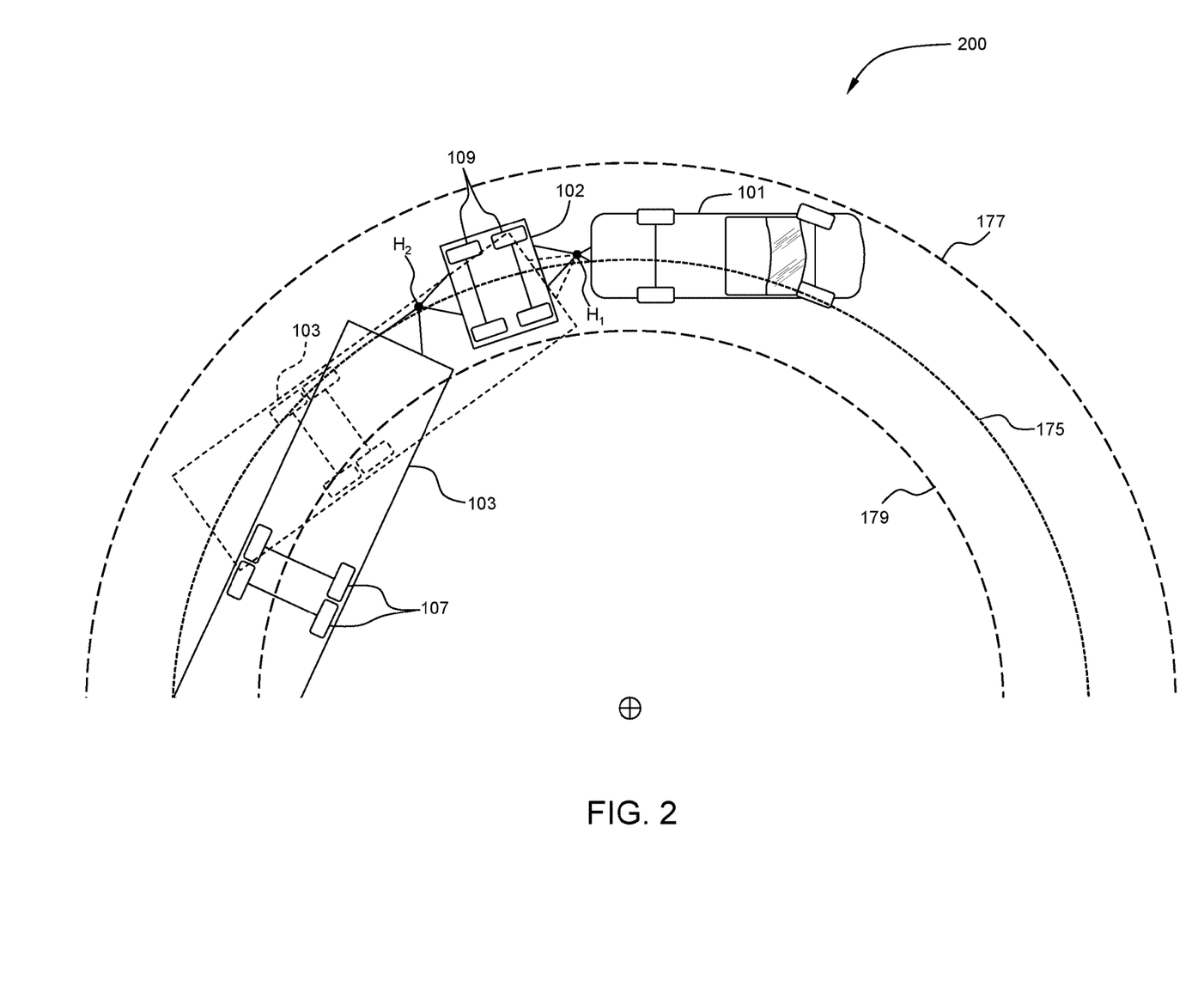
FIG. 2 illustrates a multiple trailer towing configuration and comparative single trailer towing configuration with off-tracking, in accordance with the present disclosure.

FIG. 2 illustrates a multiple trailer towing configuration 200 including a tow vehicle 101, a trailer 102 and a trailer 103. The trailer 102 is intermediate the tow vehicle 101 and the trailer 103. The tow vehicle 101 and the intermediate trailer 102 are coupled at a hitch point ($H_1$) which allows for the articulation of the trailer 102 and the tow vehicle 101 during maneuvers around curves and corners. The trailer 102 and the trailer 103 are coupled at a hitch point ($H_2$) which allows for the articulation of the trailer 102 and the trailer 103 during maneuvers around curves and corners. Multiple trailer towing configurations may exhibit some degree of off-tracking characterized by the trailer wheels 107, 109 of each respective trailer tracking to the inside of the tow vehicle 101 inner wheel path 175. Some degree of off-tracking may be acceptable. However, as the tow vehicle 101 turning radius is reduced, the amount of off-tracking of one or both trailers 102, 103 may become more pronounced. Some compensation by the driver may be obtained by controlling the tow vehicle 101 toward the outer lane limit 177 which maximizes the available turning radius. However, at some turning radius, one or both trailers 102, 103 may off-track outside of the inner lane limit 179. Multiple trailer configurations may exhibit more extreme off-tracking at the trailer 103 furthest from the tow vehicle 101 and may exhibit more extreme off-tracking than single trailer configurations (FIG. 1 and FIG. 2 broken line trailer 103).

Figure 3:
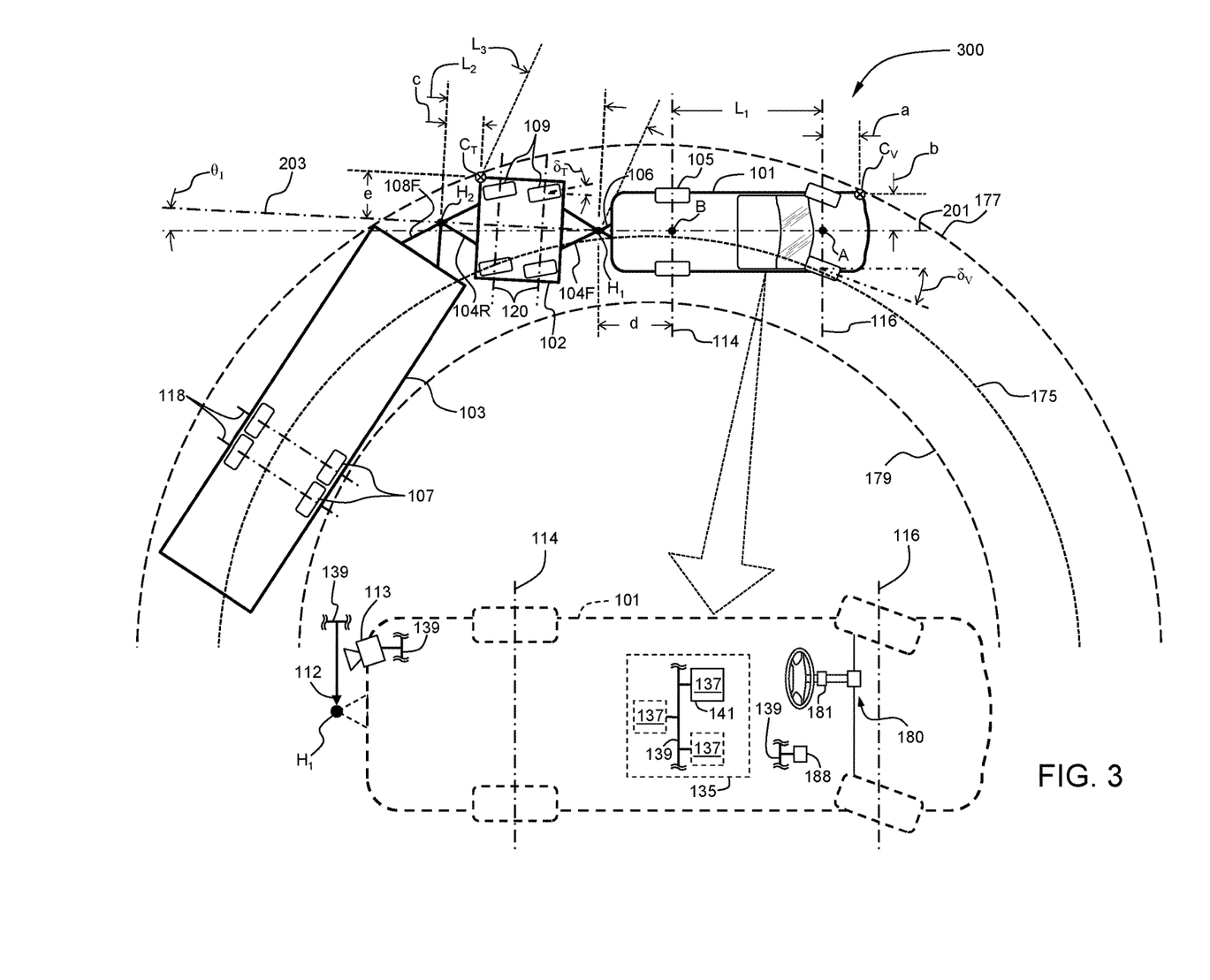
FIG. 3 illustrates a multiple trailer towing configuration with trailer tracking control, in accordance with the present disclosure.

In accordance with the present disclosure, an apparatus and method for trailer tracking control in a multiple trailer towing configuration 300 is set forth herein and in the various drawings. FIG. 3 illustrates a multiple trailer towing configuration 300 including a tow vehicle 101, a trailer 102 and a trailer 103. The trailer 102 is intermediate the tow vehicle 101 and the trailer 103. The tow vehicle 101 and the trailer 102 are coupled at a hitch point ($H_1$) which allows for the articulation of the trailer 102 and the tow vehicle 101 during maneuvers around curves and corners. The trailer 102 and the trailer 103 are coupled at a hitch point ($H_2$) which allows for the articulation of the trailer 102 and the trailer 103 during maneuvers around curves and corners.

Tow vehicle 101 may hereafter be referred to as vehicle 101 and is configured with an articulating hitch at hitch point ($H_1$). Exemplary articulating hitches at hitch point ($H_1$) may include a receiver hitch 106 with ball and a complementary front trailer tongue 104F with socket coupler, or pick-up bed mounted gooseneck and fifth wheel hitches. In any configuration, the trailer 102 and vehicle 101 articulate at the hitch point ($H_1$). An exemplary articulating hitch at hitch point ($H_2$) may include a rear trailer tongue 104R with ball and a complementary front trailer tongue 108F with socket coupler. Articulating hitch at hitch point ($H_2$) may alternatively include a gooseneck or fifth wheel type of hitch, for example. In any configuration, the vehicle 101 and trailer 102 articulate at the hitch point ($H_1$) and the trailer 102 and the trailer 103 articulate at the hitch point ($H_2$). Vehicle 101 may be a four-wheel vehicle including a tire and wheel 105 at each corner. As used herein, reference to wheel or tire is understood to mean a wheel and tire complement unless specifically called out differently. Trailer 103 is illustrated as a dual-axle trailer including two wheels 107 on each lateral side. Trailer 102 is also illustrated as a dual-axle trailer including two wheels 109 on each lateral side. Trailers 102, 103 are exemplary and not limiting, it being understood that alternative trailer configurations may, for example, include more or fewer axles. As used herein, axle is understood to mean a pair of laterally opposing wheels on a vehicle or trailer, not necessarily including a physical axle therebetween. Thus, the vehicle 101 has a front axle 116 including two front wheels, and a rear axle 114 including two rear wheels. The trailer 103 has a pair of axles 118 including four wheels, and the trailer 102 has a pair of axles 120 including four wheels. Also as used herein, wheel may refer to a single wheel or multiple wheels at one side of an axle, for example on a dually pick-up axle or a single or multi-axle dually trailer.

Vehicle 101 may include a control system architecture 135 including a plurality of electronic control units (ECU) 137 which may be communicatively coupled via a variety of suitable wired and/or wireless networks, for example via a bus structure 139, to perform control functions and information sharing, including executing control routines locally and in distributed fashion. Bus structure 139 may include a Controller Area Network (CAN), as well known to those having ordinary skill in the art. ECUs 137 may include such non-limiting examples as a powertrain control module (PCM), an engine control module (ECM), a transmission control module (TCM), a body control module (BCM), a steering control module (SCM), an electric drive unit control module, a traction control or stability control module, a cruise control module, a brake control module, etc. In one embodiment, the steering control module (SCM) 141 may be an exemplary ECU 137 primarily tasked with functions related to trailer tracking control system monitoring, control and diagnostics in accordance with the present disclosure. ECUs 137, including SCM 141, may be indirectly or directly connected to a variety of sensors and actuators, as well as any combination of the other ECUs (e.g., via bus structure 139 and/or other wired and/or wireless networks).

SCM 141 may receive a variety of information from sensors and from other ECUs 137 for use in trailer tracking control. Information received by SCM 141 may include such non limiting examples as vehicle 101 dynamic and kinematic information such as vehicle speed, heading, steering angle, multi-axis accelerations and jerks, yaw, pitch, roll and their derivative quantities, etc. Many such quantities may be generally available over vehicle bus structure 139 originating from known vehicle sensors or derived therefrom in SCM 141 or other ECU 137 (e.g. traction, stability control and/or braking modules). Such sensors may include wheel speed sensors at each wheel of the vehicle 101, steering angle sensor 181, and inertial measurement sensor 188, for example. Some sensors may provide information as direct inputs to SCM 141 while others may provide information via bus structure 139, for example where a sensor may operate as a network node device, or where such information is generally available on the bus structure via another ECU 137.

Front wheel steering of vehicle 101 may be effected by a front steering mechanism 180 which may include a steering gear and steering linkages as well known in the art. Vehicle 101 may also employ an active rear steering system. Operator steering input may be by way of a steering wheel and mechanical steering shaft interacting with the steering gear. Mechanical steering effort may be assisted by hydraulic or electrical devices. Steer-by-wire systems are known wherein operator steering intent is determined and, together with other information such as vehicle speed (V) and yaw rate ($\omega$), actuates a steering rack without the need for the mechanical steering shaft interacting with the steering gear.

The towing configuration 300 illustrated in FIG. 3 includes vehicle 101, trailer 102 and trailer 103 articulatably coupled at hitch points ($H_1$) and ($H_2$). Various geometric relationships of the towing configuration are illustrated in FIG. 3. Vehicle 101 has a longitudinal vehicle centerline 201 and the trailer 102 has a longitudinal trailer centerline 203. Each respective centerline 201, 203 passes through the towing configuration hitch point ($H_1$). A hitch articulation angle ($\theta_1$) is defined between the trailer centerline 203 and vehicle centerline 201 and is a measure of alignment deviation or articulation between the trailer 102 and vehicle 101. Hitch articulation angle ($\theta_1$) is substantially zero as the tow configuration travels in a straight line and is non-zero as the tow configuration travels around curves or corners. Hitch articulation angle ($\theta_1$) sensing is known to those skilled in the art and may be provided by a rotation sensor 112 such as an encoder or potentiometer or a vision system 113 including a camera as non-limiting examples. Rotation sensor 112, vision system 113, or an alternative hitch articulation angle ($\theta_1$) sensor may provide hitch articulation angle ($\theta_1$) information to SCM 141 via bus structure 139 for example. The vehicle 101 front axle 116 intersects vehicle centerline 201 at point (A). Point (A) may be referred to as the vehicle front axle center point (A). The vehicle 101 rear axle 114 intersects vehicle centerline 201 at point (B). Point (B) may be referred to as the vehicle rear axle center point (B). The distance between the front axle 116 and rear axle 114 of vehicle 101, that is the distance between center points (A) and (B), is labeled ($L_1$) and may be referred to as the vehicle wheelbase. The distance between rear axle center point (B) and hitch point ($H_1$) along the vehicle centerline 201 is labeled (d). The distance between the hitch point ($H_1$) and hitch point ($H_2$) along the trailer 102 centerline 203 is labeled ($L_2$) and may be referred to as the trailer 102 length. In accordance with one embodiment, an extreme outer front corner ($C_V$) of the vehicle 101 may provide an outer turn circumference reference or limit considered to be a clear path for the trailers 102, 103. An extreme outer rear corner ($C_T$) of the trailer 102 may also be defined as a limit on the trailer 102 tracking. The distance between the hitch point ($H_1$) and the extreme outer rear corner ($C_T$) of the trailer 102 is labeled ($L_3$). The extreme outer front corner ($C_V$) of vehicle 101 may be defined relative to a longitudinal distance (a) forward of the front axle center point (A) and a lateral distance (b) from the front axle center point (A) toward the outside of the current turn. Similarly, the extreme outer rear corner ($C_T$) may be defined relative to a longitudinal distance (c) from the hitch point ($H_2$) and a lateral distance (e) from the hitch point ($H_2$) toward the outside of the current turn. Steering angle sensor 181 may provide a steering angle ($\delta_V$) of the vehicle 101 front wheels. A steering angle of the trailer 102 wheels is labeled ($\delta_T$) for embodiments wherein the trailer 102 includes steerable wheels.

In one embodiment the trailer tracking control system may include the SCM 141 including control routines, various sensors and/or sensor information and the trailer 102 intermediate the vehicle and the trailer 103. The hitch articulation angle ($\theta_1$) may be controlled to a target hitch articulation angle ($\theta_{1\text{-}target}$) (discussed herein below) with one objective of reducing off-tracking of the trailer 103. In one embodiment the trailer 102 may include non-steerable wheels. In another embodiment, the trailer 102 may include steerable wheels. In one embodiment, the trailer 102 may include a friction braking system for application of braking torque to the wheels. In one embodiment, the trailer 102 may include a propulsion system for applying traction torque to one or more wheels. As used herein, traction torque may include propulsion torque and/or braking torque.

Figure 4A:
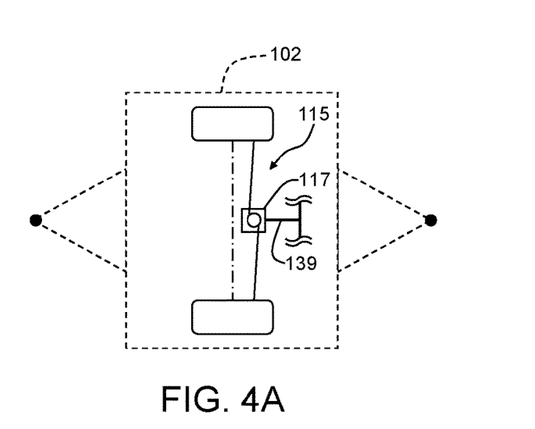
FIGS. 4A-4D illustrate embodiments of an intermediate trailer for a multiple trailer towing configuration with trailer tracking control, in accordance with the present disclosure.
Figure 4B:
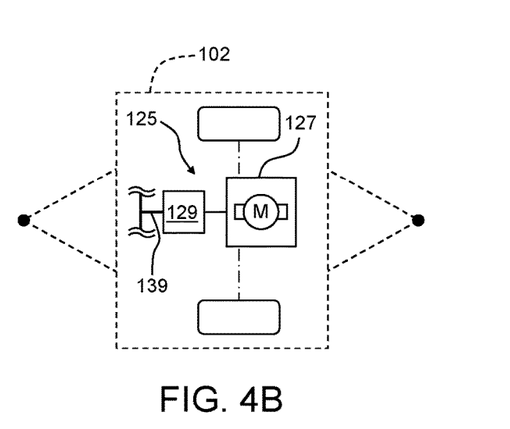
Figure 4C:
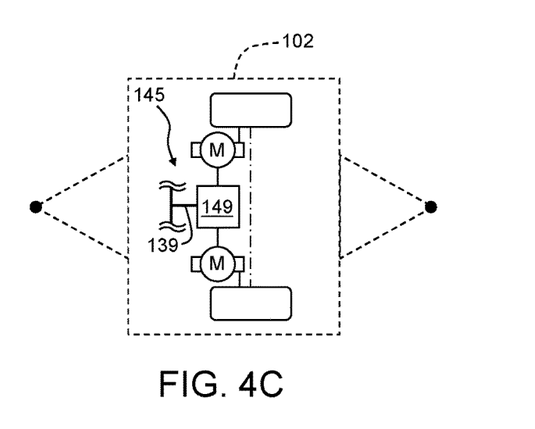
Figure 4D:
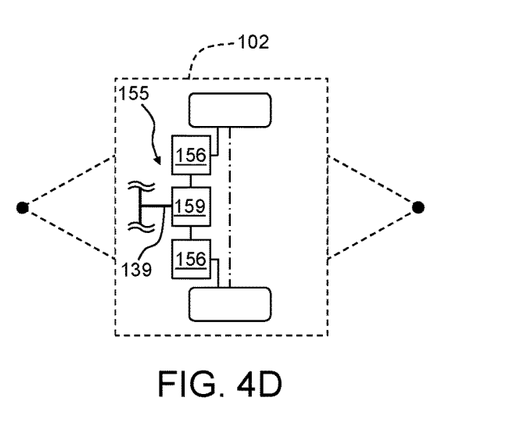

FIGS. 4A-4D illustrate individual steering, friction braking and propulsion systems which may be included in the trailer 102 alone or in various combinations. FIG. 4A illustrates one embodiment of steerable wheels on the trailer 102. Wheel steering may be effected by a trailer steering system 115 which may include a steering gear and steering linkages. Trailer steering system 115 may include an actuator 117 which causes the steering gear to steer the wheels of the trailer 102 in the desired direction. In one embodiment actuator 117 may be a rotary or linear electric motor or a hydraulic actuator or combination such as an electric-over-hydraulic actuator, for example. Other actuators may be apparent to those having ordinary skill in the art. In another embodiment, the trailer steering system 115 may include individual actuator-at-wheel mechanisms such as independent electric actuators. Actuator 117 is communicatively coupled to SCM 141 either directly such or via the bus structure 139 as illustrated which may provide control commands to the actuator 117. Trailer steering system feedback, such as steering angle ($\delta_T$), may similarly be provided to the SCM 141. Wired communication may be by way of a vehicle-to-trailer harness. Communication between the trailer 102 systems and vehicle 101 may be carried out through wireless networking. FIG. 4B illustrates one embodiment of an electrical propulsion system on the trailer 102. Wheel propulsion may be effected by a trailer propulsion system 125 which may include a drive unit 127 and controller 129. The drive unit may include, for example, an electric motor (M), power electronics, and reduction and differential gearing for applying propulsion torque at one or more wheels of the trailer 102. Differential gearing may include torque vectoring differential gearing allowing for independent torque control at each wheel. Controller 129 is communicatively coupled to SCM 141 either directly such or via the bus structure 139 as illustrated which may provide control commands to the controller 129. Wired communication may be by way of a vehicle-to-trailer harness. Communication between the trailer 102 systems and vehicle 101 may be carried out through wireless networking. FIG. 4C illustrates one embodiment of an electrical propulsion system on the trailer 102. Wheel propulsion may be effected by a trailer propulsion system 145 which may include one motor (M) per wheel and a controller 149. The controller 149 may include, for example, power electronics for controlling propulsion torque at each motor equipped wheel of the trailer 102. Controller 149 is communicatively coupled to SCM 141 either directly such or via the bus structure 139 as illustrated which may provide control commands to the controller 149. Wired communication may be by way of a vehicle-to-trailer harness. Communication between the trailer 102 systems and vehicle 101 may be carried out through wireless networking. FIG. 4D illustrates one embodiment of a friction brake system on the trailer 102. Wheel braking may be effected by a braking system 155 which may include one brake actuator 156 per wheel and a controller 159. Brake actuators 156 may be electric, hydraulic or any other suitable actuator. The controller 159 may include, for example, power electronics or hydraulic controls for controlling braking torque at each brake equipped wheel of the trailer 102. Controller 159 is communicatively coupled to SCM 141 either directly such or via the bus structure 139 as illustrated which may provide control commands to the controller 159. Wired communication may be by way of a vehicle-to-trailer harness. Communication between the trailer 102 systems and vehicle 101 may be carried out through wireless networking.

Figure 5:
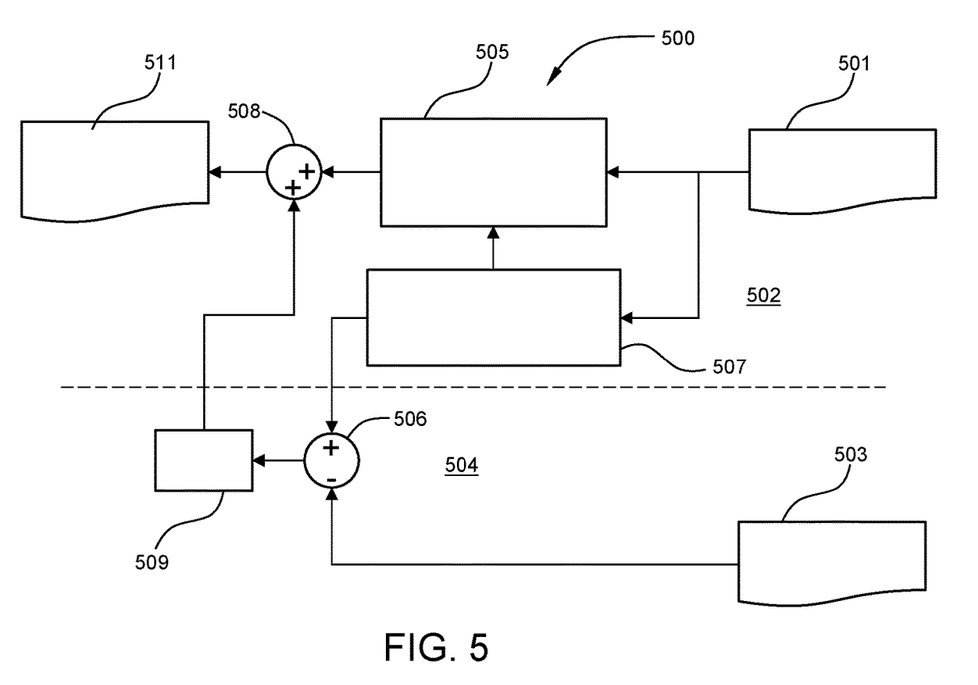
FIG. 5 illustrates an exemplary control process, in accordance with the present disclosure.

FIG. 5 illustrates an exemplary control process 500 applicable to the exemplary towing configuration 300 illustrated in FIG. 3 which includes the trailer 102 equipped with a trailer steering system. The trailer 102 may be equipped with one or more of a propulsion system and a braking system for applying traction torque to one or more wheels as described herein. The control process 500 may include a feedforward portion 502 and a feedback portion 504. In one embodiment only the feedforward portion 502 is implemented to provide open loop control of the trailer steering system. In another embodiment the feedback portion 504 is implemented in conjunction with the feedforward portion 502 to provide closed loop control of the trailer steering system. Vehicle steering angle ($\delta_V$) 501 (e.g. from steering angle sensor 181) may be used in the determination of a target hitch articulation angle ($\theta_{1\text{-}target}$) 507. Vehicle steering angle ($\delta_V$) 501 and the target hitch articulation angle ($\theta_{1\text{-}target}$) 507 may be used in the determination of a target steering angle ($\delta_{T\text{-}target}$) 505 of the trailer 102 wheels. In a feedforward only implementation, the target steering angle ($\delta_{T\text{-}target}$) 505 may be utilized directly in the determination of a steering angle command ($\delta_{T\text{-}command}$) 511 for the trailer 102 steering system. In a closed loop control of the trailer steering system, hitch articulation angle ($\theta_1$) 503 (e.g. from rotation sensor 112) may together with the target hitch articulation angle ($\theta_{1\text{-}target}$) 507 be used in the determination of a hitch articulation angle error at summing node 506. This error may be processed by PID control 509 in the determination of an adjustment to the target steering angle ($\delta_{T\text{-}target}$) 505 at summing node 508. The adjusted target steering angle ($\delta_{T\text{-}target}$) from node 508 may then be utilized in the determination of a steering angle command ($\delta_{T\text{-}command}$) 511 for the trailer 102 steering system. The PID control 509 is exemplary and one skilled in the art understands that alternate error processing control may be employed.

In one embodiment, the target hitch articulation angle ($\theta_{1\text{-}target}$) may be determined in accordance with the following relationships:

$$\theta_{1-target} = \sin^{-1}\frac{\lambda\tan\delta_V}{\sqrt{d^2(\tan\delta_V)^2 + L_1^2}} - \tan^{-1}\frac{e}{L_2 - c} - \cos^{-1}\frac{L_1}{\sqrt{d^2(\tan\delta_V)^2 + L_1^2}} \quad [1]$$

$$\lambda = \frac{(a+L_1)^2 - (L_3^2 + d^2) + \frac{2bL_1}{\tan\delta_V} + b^2}{2L_3} \quad [2]$$

$$L_3 = \sqrt{(L_2 - c)^2 + e^2} \quad [3]$$

wherein $L_1$ is the vehicle 101 wheelbase;

$L_2$ is the trailer 102 length;

$L_3$ is the distance between the hitch point ($H_1$) and the extreme outer rear corner ($C_T$) of the trailer 102;

$\delta_V$ is the vehicle 101 steering angle;

a is the longitudinal distance forward of the vehicle 101 from the vehicle 101 front axle center point (A) to the extreme outer front corner ($C_V$) of the vehicle 101 toward the outside of the current turn;

b is the lateral distance from the vehicle 101 front axle center point (A) to the extreme outer front corner ($C_V$) of the vehicle 101 toward the outside of the current turn;

c is the longitudinal distance from the hitch point ($H_2$) to the extreme outer rear corner ($C_T$) on the trailer 102 toward the outside of the current turn;

d is the distance between a rear axle center point (B) and the hitch point ($H_1$) along the vehicle centerline 201; and e is the lateral distance from the hitch point ($H_2$) to the extreme outer rear corner ($C_T$) on the trailer 102 toward the outside of the current turn.

In one embodiment, the target steering angle ($\delta_{T\text{-}target}$) of the trailer 102 wheels may be determined in accordance with the following relationship and the target hitch articulation angle ($\theta_{1\text{-}target}$) as determined in accordance with the relationships [1]-[3] above:

$$\delta_{T-target} = \theta_{1-target} + \tan^{-1}\left[\frac{\tan\delta_V\left(d + \frac{L_2}{2}\cos\theta_{1-target}\right)}{L_1 + \frac{L_2}{2}\sin\theta_{1-target}\tan\delta_V}\right] \quad [4]$$

Figure 6:
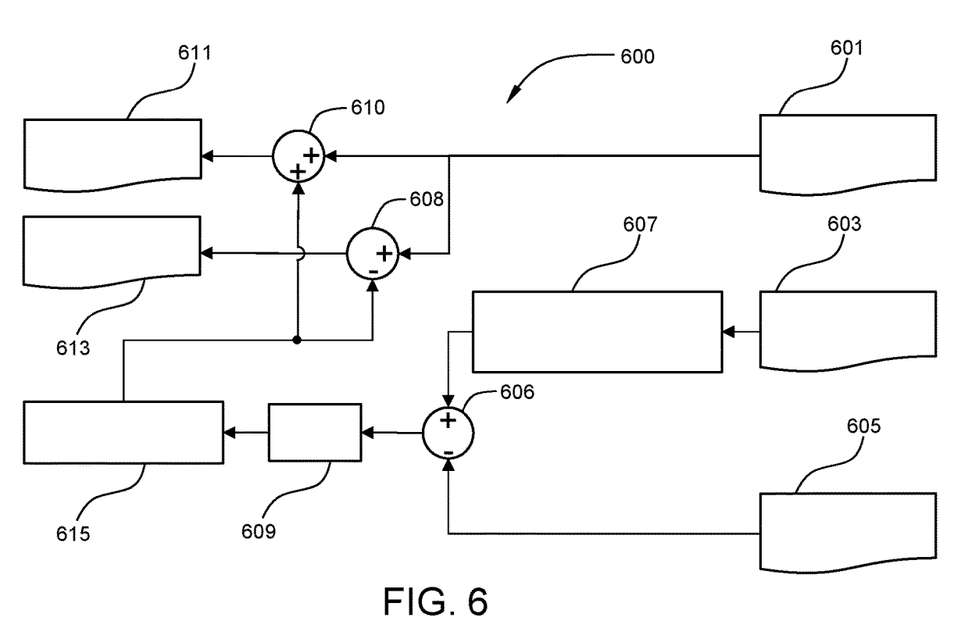
FIG. 6 illustrates an exemplary control process, in accordance with the present disclosure.

FIG. 6 illustrates an exemplary control process 600 applicable to the exemplary towing configuration 300 illustrated in FIG. 3 which includes the trailer 102 not necessarily equipped with a trailer 102 steering system but may be equipped with one or more of a propulsion system and a braking system for applying traction torque to one or more wheels as described herein whereby differential steering of the trailer 102 may be effected. Vehicle steering angle ($\delta_V$) 603 (e.g. from steering angle sensor 181) may be used in the determination of the target hitch articulation angle ($\theta_{1\text{-}target}$) 607. The hitch articulation angle ($\theta_1$) 605 (e.g. from rotation sensor 112) may together with the target hitch articulation angle ($\theta_{1\text{-}target}$) 607 be used in the determination of a hitch articulation angle error at summing node 606. This error may be processed by PID control 609 and then by control transformation 615 in the determination of speed adjustments to laterally opposite wheels of the trailer 102 to effect differential steering of the trailer 102. In the present embodiment, control transformation 615 adjusts the PID control 609 output to generate a wheel speed adjustment applied to nodes 608 and 610. Vehicle speed (V) 601 (e.g. from wheel speed sensors) is also provided to summing nodes 608 and 610 and represents the unadjusted wheel speed of the trailer 102 wheels. The adjusted trailer 102 wheel speeds from the summing nodes 608 and 610 may then be utilized in the determination of traction torque commands (e.g. propulsion and/or braking) for left 611 and right 613 trailer 102 wheels for the trailer 102 propulsion and/or braking system(s). The PID control 609 is exemplary and one skilled in the art understands that alternate error processing control may be employed.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

Or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An apparatus for towing a first trailer by a tow vehicle, comprising:

a second trailer comprising at least one axle and at least two wheels, a first hitch point and a second hitch point, the second trailer articulatably coupled to the tow vehicle at the first hitch point at a hitch articulation angle and articulatably coupled to the first trailer at the second hitch point;

a controller configured to establishing the hitch articulation angle to a target hitch articulation angle;
the at least two wheels comprise steerable wheels and wherein the controller is configured to establish the hitch articulation angle to the target hitch articulation angle by controlling a steering angle of the steerable wheels; and
wherein controlling the steering angle of the steerable wheels comprises:
determining the target hitch articulation angle based upon a steering angle of the tow vehicle using the controller;
determining a target steering angle of the steerable wheels based upon the steering angle of the tow vehicle and the target hitch articulation angle using the controller;
controlling the steering angle of the steerable wheels to the target steering angle of the steerable wheels using the controller;
wherein the controller includes a memory storing instructions configured to cause the controller to determine the target hitch articulation angle in accordance with the following relationships:

$$\theta_{1-target} = \sin^{-1}\frac{\lambda\tan\delta_V}{\sqrt{d^2(\tan\delta_V)^2 + L_1^2}} - \tan^{-1}\frac{e}{L_2 - c} - \cos^{-1}\frac{L_1}{\sqrt{d^2(\tan\delta_V)^2 + L_1^2}};$$

$$\lambda = \frac{(a+L_1)^2 - (L_3^2 + d^2) + \frac{2bL_1}{\tan\delta_V} + b^2}{2L_3}; \text{ and } L_3 = \sqrt{(L_2 - c)^2 + e^2};$$

wherein $\theta_{1-target}$ is the target hitch articulation angle;
$L_1$ is a wheelbase of the tow vehicle;
$L_2$ is a second trailer length between the first hitch point and the second hitch point;
$L_3$ is a distance between the first hitch point and a predetermined point on the second trailer;
$\delta_V$ is the steering angle of the tow vehicle;
a is a longitudinal distance from a front axle center point on the tow vehicle to a predetermined point on the tow vehicle;
b is a lateral distance from the front axle center point to the predetermined point on the tow vehicle;
c is a longitudinal distance from the second hitch point to the predetermined point on the second trailer;
d is a distance between a rear axle center point on the tow vehicle and the first hitch point; and
e is a lateral distance from the second hitch point to the predetermined point on the second trailer.

2. The apparatus of claim 1, wherein the hitch articulation angle is established to the target hitch articulation angle by controlling a speed differential between the at least two wheels using the controller.

3. The apparatus of claim 1, wherein controlling the steering angle of the steerable wheels using the controller further comprises:
determining an error between a measured hitch articulation angle and the target hitch articulation angle using the controller; and
adjusting the target steering angle of the steerable wheels based upon the error using the controller.

4. The apparatus of claim 1, wherein the target steering angle is determined by the controller in accordance with the following relationships:

$$\delta_{T-target} = \theta_{1-target} + \tan^{-1}\left[\frac{\tan\delta_V\left(d + \frac{L_2}{2}\cos\theta_{1-target}\right)}{L_1 + \frac{L_2}{2}\sin\theta_{1-target}\tan\delta_V}\right];$$

wherein $\delta_{T-target}$ is the target steering angle;
$\theta_{1-target}$ is the target hitch articulation angle;
$L_1$ is a wheelbase of the tow vehicle;
$L_2$ is a second trailer length between the first hitch point and the second hitch point;
$\delta_V$ is the steering angle of the tow vehicle; and
d is a distance between a rear axle center point on the tow vehicle and the first hitch point.

5. The apparatus of claim 2, wherein the target hitch articulation angle is based upon a steering angle of the tow vehicle.

6. The apparatus of claim 2, wherein controlling the speed differential between the at least two wheels using the controller comprises:
determining an error between a measured hitch articulation angle and the target hitch articulation angle using the controller; and
adjusting the speed differential between the at least two wheels based upon the error using the controller.

7. The apparatus of claim 1 wherein the second trailer comprises a powertrain providing propulsion torque to at least one of the two wheels.

8. The apparatus of claim 2 wherein the second trailer comprises a powertrain providing propulsion torque to at least one of the two wheels.

9. The apparatus of claim 1 wherein the second trailer comprises a system providing braking torque to at least one of the two wheels.

10. The apparatus of claim 2 wherein the second trailer comprises a system providing braking torque to at least one of the two wheels.

11. A towing system, comprising:
a tow vehicle;
a first trailer;
a second trailer intermediate the tow vehicle and the first trailer, the second trailer comprising at least one axle and at least two wheels and a steering system, the second trailer articulatably coupled to the tow vehicle at a first hitch point at a hitch articulation angle and articulatably coupled to the first trailer at a second hitch point;
a controller configured to establish the hitch articulation angle to a target hitch articulation angle by controlling steering of the at least two wheels of the second trailer; and
wherein the target hitch articulation angle is determined by the controller in accordance with the following relationships:

$$\theta_{1-target} = \sin^{-1}\frac{\lambda\tan\delta_V}{\sqrt{d^2(\tan\delta_V)^2 + L_1^2}} - \tan^{-1}\frac{e}{L_2 - c} - \cos^{-1}\frac{L_1}{\sqrt{d^2(\tan\delta_V)^2 + L_1^2}};$$

$$\lambda = \frac{(a+L_1)^2 - (L_3^2 + d^2) + \frac{2bL_1}{\tan\delta_V} + b^2}{2L_3}; \text{ and } L_3 = \sqrt{(L_2 - c)^2 + e^2};$$

wherein $\theta_{1-target}$ is the target hitch articulation angle;
$L_1$ is a wheelbase of the tow vehicle;

$L_2$ is a second trailer length between the first hitch point and the second hitch point;

$L_3$ is a distance between the first hitch point and a predetermined point on the second trailer;

$\delta_V$ is the steering angle of the tow vehicle;

a is a longitudinal distance from a front axle center point on the tow vehicle to a predetermined point on the tow vehicle;

b is a lateral distance from the front axle center point to the predetermined point on the tow vehicle;

c is a longitudinal distance from the second hitch point to the predetermined point on the second trailer;

d is a distance between a rear axle center point on the tow vehicle and the first hitch point; and e is a lateral distance from the second hitch point to the predetermined point on the second trailer.

12. The towing system of claim 11, wherein controlling steering of the at least two wheels of the second trailer comprises:

determining the target hitch articulation angle based upon a steering angle of the tow vehicle using the controller;

determining a target steering angle of the at least two wheels of the second trailer based upon the steering angle of the tow vehicle and the target hitch articulation angle using the controller; and controlling a steering angle of the at least two wheels of the second trailer to the target steering angle of the at least two wheels of the second trailer using the controller.

13. The towing system of claim 12, wherein controlling steering of the at least two wheels of the second trailer further comprises:

determining an error between a measured hitch articulation angle and the target hitch articulation angle using the controller; and adjusting the target steering angle of the at least two wheels of the second trailer based upon the error using the controller.

14. A towing system, comprising:

a tow vehicle;

a first trailer;

a second trailer intermediate the tow vehicle and the first trailer, the second trailer comprising at least one axle and at least two wheels, the second trailer articulatably coupled to the tow vehicle at a first hitch point at a hitch articulation angle and articulatably coupled to the first trailer at a second hitch point;

a controller configured to establish the hitch articulation angle to a target hitch articulation angle by controlling a speed differential between the at least two wheels of the second trailer; and wherein the target hitch articulation angle is determined using the controller in accordance with the following relationships:

$$\theta_{1-target} = \sin^{-1}\frac{\lambda \tan\delta_V}{\sqrt{d^2(\tan\delta_V)^2 + L_1^2}} - \tan^{-1}\frac{e}{L_2 - c} - \cos^{-1}\frac{L_1}{\sqrt{d^2(\tan\delta_V)^2 + L_1^2}};$$

$$\lambda = \frac{(a + L_1)^2 - (L_3^2 + d^2) + \frac{2bL_1}{\tan\delta_V} + b^2}{2L_3}; \text{ and } L_3 = \sqrt{(L_2 - c)^2 + e^2};$$

wherein $\theta_{1-target}$ is the target hitch articulation angle;

$L_1$ is a wheelbase of the tow vehicle;

$L_2$ is a second trailer length between the first hitch point and the second hitch point;

$L_3$ is a distance between the first hitch point and a predetermined point on the second trailer;

$\delta_V$ is the steering angle of the tow vehicle;

a is a longitudinal distance from a front axle center point on the tow vehicle to a predetermined point on the tow vehicle;

b is a lateral distance from the front axle center point to the predetermined point on the tow vehicle;

c is a longitudinal distance from the second hitch point to the predetermined point on the second trailer;

d is a distance between a rear axle center point on the tow vehicle and the first hitch point; and e is a lateral distance from the second hitch point to the predetermined point on the second trailer.

15. The towing system of claim 14, wherein controlling the speed differential between the at least two wheels of the second trailer comprises:

Determining the target hitch articulation angle based upon a steering angle of the tow vehicle using the controller;

determining an error between a measured hitch articulation angle and the target hitch articulation angle using the controller; and adjusting the speed differential between the at least two wheels of the second trailer based upon the error using the controller.

* * * * *